US010554700B2

(12) United States Patent
Lattanzi et al.

(10) Patent No.: US 10,554,700 B2
(45) Date of Patent: Feb. 4, 2020

(54) METHOD AND APPARATUS FOR MANAGEMENT OF COMMUNICATION CONFERENCING

(71) Applicants: AT&T INTELLECTUAL PROPERTY I, LP, Atlanta, GA (US); AT&T MOBILITY II LLC, Atlanta, GA (US)

(72) Inventors: Michael Lattanzi, Bothell, WA (US); Steven M. Belz, Sunnyvale, TX (US); James Pratt, Round Rock, TX (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 324 days.

(21) Appl. No.: 14/817,672

(22) Filed: Aug. 4, 2015

(65) Prior Publication Data
US 2017/0041354 A1    Feb. 9, 2017

(51) Int. Cl.
*H04L 29/06*    (2006.01)
(52) U.S. Cl.
CPC ........ *H04L 65/1089* (2013.01); *H04L 65/403* (2013.01)
(58) Field of Classification Search
CPC .......................... H04L 65/1089; H04L 65/403
USPC ........................................ 709/227, 232, 245
See application file for complete search history.

(56) References Cited

U.S. PATENT DOCUMENTS

| 5,673,080 | A | * | 9/1997 | Biggs .................. H04M 3/567 348/14.09 |
| 6,807,563 | B1 |  | 10/2004 | Christofferson et al. |
| 6,839,417 | B2 |  | 1/2005 | Weisman et al. |
| 7,107,312 | B2 |  | 9/2006 | Hackbarth et al. |
| 7,522,181 | B2 |  | 4/2009 | Wilson, Jr. et al. |
| 7,664,490 | B2 |  | 2/2010 | Aaby et al. |
| 8,150,450 | B1 | * | 4/2012 | Wengrovitz .......... H04L 65/403 455/416 |
| 8,265,240 | B2 |  | 9/2012 | Langgood et al. |
| 8,271,667 | B2 | * | 9/2012 | Hoshino ............ H04L 29/06027 370/260 |
| 8,325,894 | B2 |  | 12/2012 | Kim et al. |

(Continued)

FOREIGN PATENT DOCUMENTS

| DE | 3818087 A1 | 12/1989 |
| EP | 1317123 B1 | 1/2006 |

OTHER PUBLICATIONS

Barnes, M. et al., "A framework for centralized conferencing", RFC5239 (Jun. 2008) (2008).

(Continued)

*Primary Examiner* — David R Lazaro
*Assistant Examiner* — Berhanu Shitayewoldetadik
(74) *Attorney, Agent, or Firm* — Guntin & Gust, PLC; Mark Wilinski

(57) ABSTRACT

Aspects of the subject disclosure may include, for example, detecting another communication device during a communication session, adjusting without interruption the communication session to add the other communication device responsive to a determination according to conferencing information that the other communication device is authorized to join in the communication session, and controlling access by the other communication device to the communication session according to user input. Other embodiments are disclosed.

20 Claims, 7 Drawing Sheets

(56) References Cited

U.S. PATENT DOCUMENTS

| | | |
|---|---|---|
| 8,363,808 B1 | 1/2013 | Bland et al. |
| 8,521,144 B2 | 8/2013 | Quade et al. |
| 8,565,401 B2 | 10/2013 | O'Sullivan et al. |
| 8,630,208 B1 * | 1/2014 | Kjeldaas ............ H04L 12/1822 370/260 |
| 8,654,954 B2 | 2/2014 | Gaudin et al. |
| 8,681,203 B1 | 3/2014 | Yin et al. |
| 8,812,621 B2 * | 8/2014 | Begen ............... H04L 65/1069 709/219 |
| 8,887,070 B1 | 11/2014 | Foster et al. |
| 8,917,633 B2 | 12/2014 | Marchevsky et al. |
| 9,077,763 B2 * | 7/2015 | Simongini ............ H04W 4/021 |
| 2004/0028199 A1 * | 2/2004 | Carlson ................. H04M 3/56 379/93.21 |
| 2004/0141605 A1 | 7/2004 | Chen et al. |
| 2005/0031110 A1 | 2/2005 | Haimovich et al. |
| 2005/0267965 A1 * | 12/2005 | Heller ..................... H04L 41/00 709/224 |
| 2006/0047960 A1 * | 3/2006 | Ono ....................... H04L 9/0825 713/171 |
| 2006/0072542 A1 * | 4/2006 | Sinnreich ............ H04L 12/2854 370/351 |
| 2007/0047694 A1 * | 3/2007 | Bouchard ............... H04M 3/38 379/67.1 |
| 2009/0086948 A1 | 4/2009 | Narang et al. |
| 2009/0112985 A1 | 4/2009 | Quinn et al. |
| 2009/0164293 A1 * | 6/2009 | Coley ............ G06Q 10/06311 705/7.13 |
| 2009/0264113 A1 | 10/2009 | Jheng et al. |
| 2009/0316870 A1 | 12/2009 | Wise et al. |
| 2010/0011108 A1 * | 1/2010 | Clark ..................... H04W 76/40 709/227 |
| 2010/0015955 A1 * | 1/2010 | Backlund ............... H04W 76/20 455/414.1 |
| 2010/0254370 A1 * | 10/2010 | Jana ..................... H04L 65/1016 370/352 |
| 2011/0142221 A1 | 6/2011 | Tofighbakhsh et al. |
| 2011/0143713 A1 * | 6/2011 | Luft ......................... H04M 1/68 455/415 |
| 2012/0086769 A1 | 4/2012 | Huber et al. |
| 2012/0102131 A1 * | 4/2012 | Lin ......................... H04L 12/66 709/207 |
| 2012/0185291 A1 | 7/2012 | Ramaswamy et al. |
| 2012/0284014 A1 * | 11/2012 | Zivkovic ............... G06F 17/289 704/3 |
| 2012/0294436 A1 | 11/2012 | Park et al. |
| 2013/0051543 A1 | 2/2013 | McDysan et al. |
| 2013/0125185 A1 * | 5/2013 | Jana ..................... H04L 65/1016 725/109 |
| 2013/0212287 A1 * | 8/2013 | Chappelle ............... H04M 3/58 709/227 |
| 2013/0257757 A1 * | 10/2013 | Kim ........................ G06F 3/165 345/173 |
| 2013/0311893 A1 * | 11/2013 | Dearman ............... G06Q 10/00 715/738 |
| 2014/0045472 A1 * | 2/2014 | Sharma .................... H04W 4/08 455/416 |
| 2014/0073300 A1 | 3/2014 | Leeder et al. |
| 2014/0114664 A1 | 4/2014 | Khan et al. |
| 2014/0181683 A1 * | 6/2014 | Lim ....................... H04L 63/105 715/740 |
| 2014/0269443 A1 | 9/2014 | Hyde et al. |
| 2014/0359709 A1 * | 12/2014 | Nassar ................. H04L 65/1083 726/4 |
| 2014/0370867 A1 | 12/2014 | Fields |
| 2015/0109399 A1 | 5/2015 | Kuscher |
| 2016/0095141 A1 * | 3/2016 | Ma ......................... H04W 76/10 455/416 |

OTHER PUBLICATIONS

Eaton, Benjamim et al., "Bitching, bouncing and brawling—How backchannels brought colour to conference calls", ECIS. 2009.

Kellogg, Wendy A. et al., "Leveraging digital backchannels to enhance user experience in electronically mediated communication", Proceedings of the 2006 20th anniversary conference on Computer supported cooperative work. ACM, 2006.

Moors, Tim, "The SmartPhone: Interactive group audio with complementary symbolic control", Distributed Communities on the Web. Springer Berlin Heidelberg, 2002.

Murai, Kazumasa et al., "Mediated meeting interaction for teleconferencing", Multimedia and Expo, 2005. ICME 2005. IEEE International Conference, IEEE, 2005.

Yankelovich, Nicole et al., "Meeting central: making distributed meetings more effective", Proceedings of the 2004 ACM conference on Computer supported cooperative work. ACM, 2004.

* cited by examiner

100

METHOD AND APPARATUS FOR MANAGEMENT OF COMMUNICATION CONFERENCING

FIELD OF THE DISCLOSURE

The subject disclosure relates to a method and apparatus for management of communication conferencing.

BACKGROUND

Users often desire to share information and/or experiences via communication devices. Conferencing techniques allow for more than two users utilizing different devices to participate in a conference, such as a voice call conference. Circumstances sometimes change during a conference, including who desires to continue to be part of the conference or who would like to be part of the conference.

BRIEF DESCRIPTION OF THE DRAWINGS

Reference will now be made to the accompanying drawings, which are not necessarily drawn to scale, and wherein.

DETAILED DESCRIPTION

Figure 1:
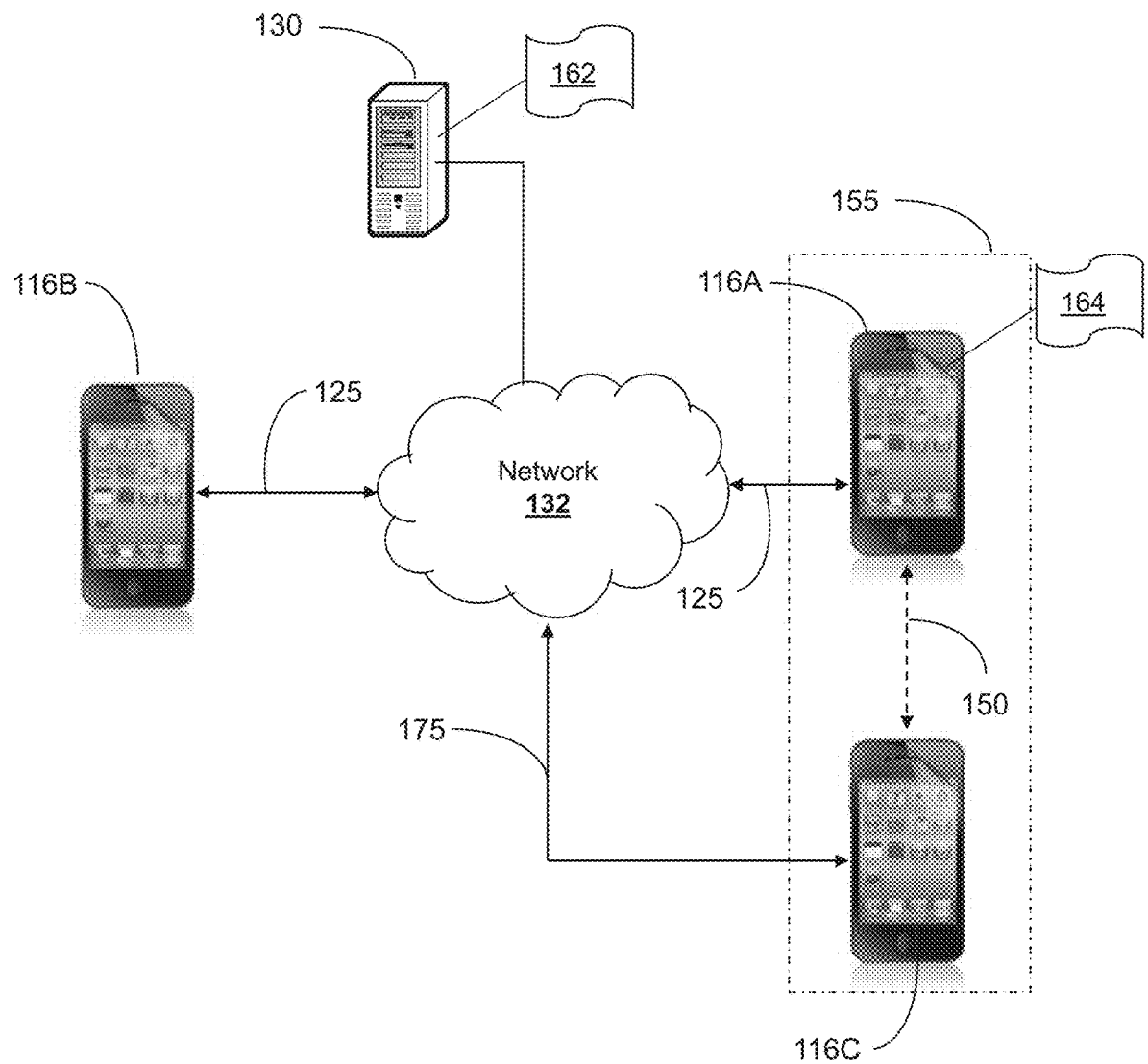
FIG. 1 depicts an illustrative embodiment of a system that manages communications to enable seamless adding and/or removing of devices from a communication session.

The subject disclosure describes, among other things, illustrative embodiments for providing seamless adjustments to communication sessions. Devices can be added to a communication session without interrupting the communication session. The addition of a device can be based on pre-authorization data, such as family, friends, business associates and so forth, for one or more original parties to the communication session indicating users and/or devices that are permitted or otherwise authorized to be added to the communication session. Other embodiments are described in the subject disclosure.

One embodiment of the subject disclosure includes a first communication device having a user interface, a processor coupled with the user interface, and a memory that stores executable instructions that, when executed by the processor, facilitate performance of operations, including participating in a communication session with a second communication device, where the communication session provides voice communications. The processor can detect, during the communication session, a third communication device in proximity to the first communication device. The processor can access, during the communication session, conferencing information indicating users that are authorized to join in the communication session. The processor can, responsive to a determination that a user of the third communication device is authorized to join in the communication session according to the conferencing information, transmit a session adjustment request to a network server during the communication session. The session adjustment request can be transmitted without interrupting the communication session. The transmitting of the session adjustment request causes the network server to adjust the communication session to add the third communication device. The processor can receive user input at the user interface and can control access by the third communication device to the communication session according to the user input.

One embodiment of the subject disclosure is a method including receiving, by a network server, a session adjustment request during a communication session providing voice communications between first and second communication devices, where the session adjustment request identifies a third communication device. The method can include accessing, by the network server, conferencing information indicating communication devices that are authorized to join in the communication session. The method can include, responsive to a determination that the third communication device is authorized to join in the communication session according to the conferencing information, adjusting, by the network server, the communication session to enable the third communication device to participate in the communication session without interrupting the communication session. The method can include controlling, by the network server, access by the third communication device to the communication session according to a control signal received from the first communication device during the communication session.

One embodiment of the subject disclosure includes a machine-readable storage device, having executable instructions that, when executed by a processor of a first communication device, facilitate performance of operations, including participating in a communication session with a second communication device. The processor can detect, during the communication session, a third communication device in proximity to the first communication device. The processor can transmit a session adjustment request to a network server during the communication session, where the session adjustment request is transmitted without interrupting the communication session. The transmitting of the session adjustment request can cause the network server to adjust the communication session to add the third communication device responsive to a determination according to conferencing information that the third communication device is authorized to join in the communication session. The processor can receive user input at a user interface of the first communication device. The processor can control access by the third communication device to the communication session according to the user input.

In one or more embodiments, a device(s) can generate or otherwise have access to a trusted auto-join participant (TAP) list. An auto-join service can be activated when a TAP device is engaged in a communication session, such as a voice call, and another TAP device seeks to join the communication session. In one embodiment, devices (and/or users) can be populated into the TAP list by via an NFC function which can include authorization such as user input at a first device indicating that the second device and/or second user is allowed to be on the TAP list of the first device. For example, touching mom's mobile phone and daughter's mobile phone against dad's mobile phone can add them as trusted participants. In one embodiment, a detection can be made that a TAP device has entered a preset proximity, such as via cellular, Wi-Fi, or Bluetooth detection. The detected TAP device can be authenticated, and a notification can be presented of the auto-join capability. In one embodiment, pre-defined rules or permissions can be generated and stored to control when the auto-join function is to be applied, including designated parties on the TAP list that are or are not allowed to be part of an auto-join communication session with each other.

FIG. 1 depicts an illustrative embodiment of a system 100 that allows an on-going communication session to be adjusted to add authorized parties or devices. System 100 provides for a seamless adjustment to the communication session which does not require a user to dial any numbers or provide any identification information to add the party. In one embodiment, system 100 enables trusted individuals within close proximity to automatically join into a private communication session, such as a voice or video conference, without invoking or requiring a manual initiation or dial-in to the communication session.

System 100 can include any number of communication devices 116 that can participate in a communication session that is established or otherwise facilitated via network 132. The communication devices 116 (only three of which are shown) can be various types of devices including wired devices, wireless devices, mobile devices, mobile telephones, landline telephones, tablets, set top boxes, laptop computers, desktop computers, and so forth. The communication session can be various types of communication sessions including voice communications, video communications, gaming communications, and so forth. The network 132 can be various types of networks (including wired and/or wireless networks) that utilize various components (e.g., routers, switches, servers, and so forth) to provide communication services utilizing various protocols.

Figure 2:
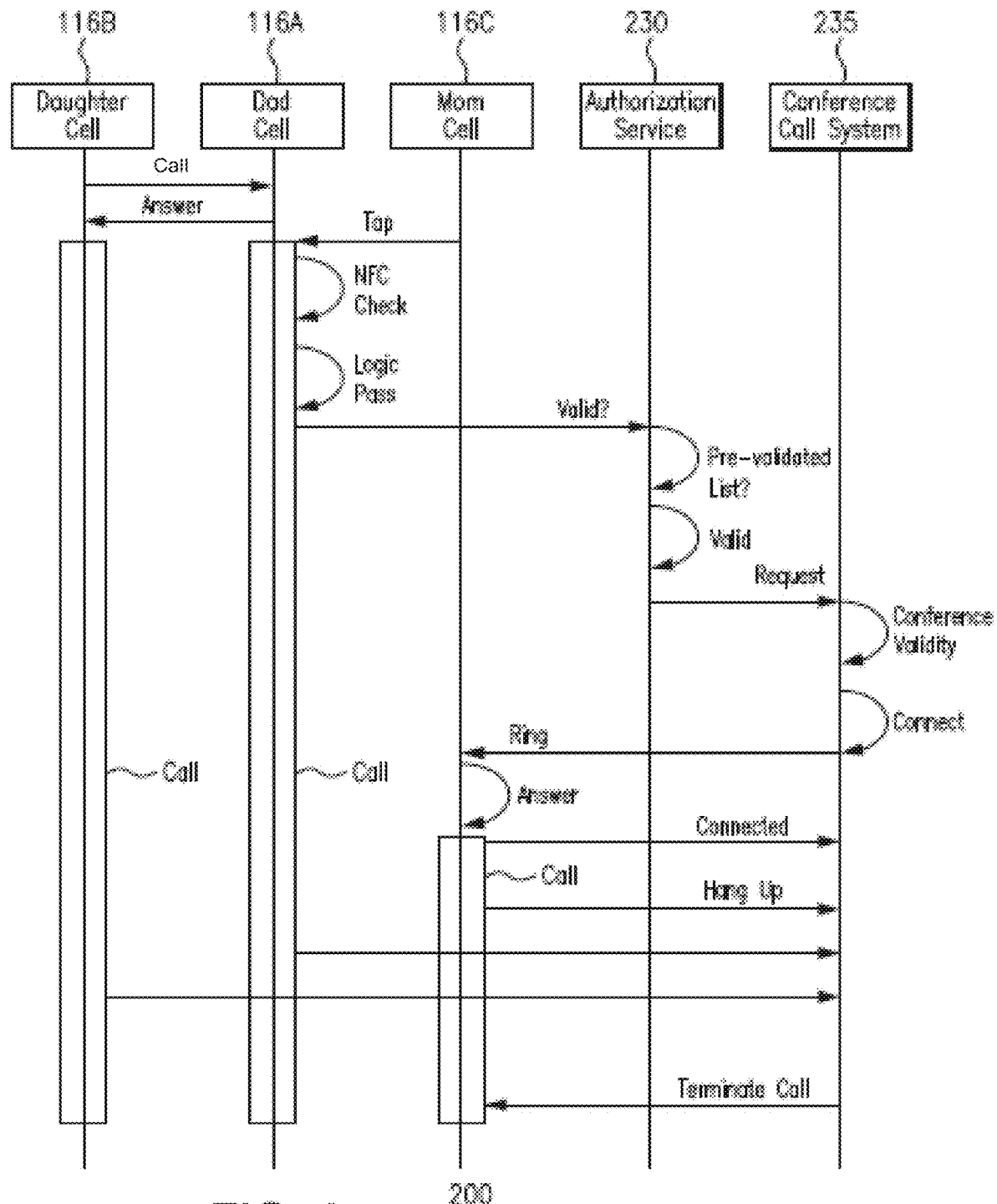
FIG. 2 depicts an illustrative embodiment of a signaling flow that can be used for seamless adding and/or removing of devices from a communication session.

In the example illustrated in FIG. 2, a first communication device 116A can be engaged in a communication session 125 with a second communication device 116B via network 132, such as a voice call. The communication session can be originated by either device 116A or 116B. The first communication device 116A can detect, during the communication session 125, a third communication device 116C. As an example, a proximity detection of the third communication device 116C can be performed where the third communication enters a proximity area 155 of the first communication device 116A. The proximity detection can be performed in various ways including based on signals sent out by the first communication device 116A and/or by the second communication device 116B. The particular threshold proximity for detection can vary and can include a near-field proximity where the detection is according to a Near-Field Communications NFC protocol performed by near-field components of the first and/or third communication devices 116A and 116C. The detection can be based on various types of signals including Radio Frequency (RF) signals, Infrared (IR) signals, magnetic fields, and so forth. In one embodiment, the detection by the first communication device 116A can be responsive to a request or other initiation performed at or by the third communication device 116C. For instance, the third communication device 116C can receive user input and transmit a short-range communication signal to notify the first communication device 116A that the third communication device is present and in proximity thereto. Very close proximity triggers can also be utilized, including physical contact or near-physical contact of the first and second communication devices 116A and 116C to trigger the detection.

System 100 allows a determination to be made as to whether the third communication device 116C is authorized to join the communication session 125. In one embodiment, this determination can be made by the first communication device 116A which can access, during the communication session, conferencing information indicating devices and/or users that are authorized to join in the communication session 125. For example, the conferencing information can be stored locally in a memory of the first communication device 116A. In another embodiment, the conferencing information can be stored remotely at a network database. In another embodiment, the determination being made by first communication device 116A according to the conferencing information can be performed in conjunction with an authorization associated with the second communication device 116B. For example, the first communication device 116A can determine whether the third communication device 116C is included in a first list of authorized devices (or authorized users) that is stored locally by the first communication device (or remotely at the network database) and can determine whether the third communication device 116C is included in a second list of authorized devices (or authorized users) that is stored locally by the second communication device 116B (or remotely at the network database). Continuing with this example, the first communication device 116A can directly access the second communication device's second list of authorized users/devices or can request that the second communication device 116B performs a similar determination utilizing the second list of authorized users/devices.

In one embodiment, the determination as to whether the third communication device 116C is authorized to join the communication session 125 can be made by a network server 130 which can access, during the communication session, conferencing information stored in a network database indicating users that are authorized to join in the communication session. For example, the network server 130 can access a first list of authorized users/devices for the first communication device 116A and/or can access a second list of authorized users/devices for the second communication device 116B.

In one embodiment, the network server 130 can determine whether the third communication device 116C is identified in both of the first and second lists of authorized users/devices for the first and second communication devices 116A and 116B. If the third communication device 116C is listed in both of the first and second lists then a determination can be made that the third communication device is authorized to join the communication session 125. If the third communication device 116C is listed in only one of the first and second lists then a determination can be made that the third communication device is potentially authorized to join the communication session 125 and the network server 130 can transmit a further authorization request to the particular communication device whose list does not include the third communication device 116C. In this example, the further authorization request can be transmitted to and presented at the particular one of the first or second communication devices 116A and 116B without interruption of the communication session 125, such as providing an audible and/or visual alert at the particular communication device and enabling user input to confirm the authorization (e.g., a prompt shown on a display screen of the particular communication device indicating that the user of the third communication device desires to join the communication session 125). If the third communication device 116C is not listed in either of the first and second lists then a determination can be made that the third communication device is not authorized to join the communication session 125. In one embodiment, the network server 130 can transmit a further authorization request to the first communication device 116A and/or the second communication device 116B to determine if the third communication device 116C should still be permitted to join the communication session 125.

In one embodiment, the determination as to whether the third communication device 116C is authorized to join the communication session 125 can be made by a combination of the network server 130, the first communication device 116A and/or the second communication device 116B. For example, the first communication device 116A can determine that the third communication device 116C is identified in the first list of authorized users/devices stored by the first communication device and the network server 130 can determine that the third communication device 116C is identified in the second list of authorized users/devices associated with the second communication device 116B where a copy of that second list is stored by or otherwise accessible to the network server. In another embodiment, the authorization determination can be performed at different levels. For instance, the first and/or second communication devices 116A and 116B can determine that the third communication device 116C is an authorized device (e.g., based on stored conferencing information indicating the authorized users/devices and/or based on receiving user input during the communication session indicating the authorization) and the network server 130 can determine that one or more of the first, second or third communication devices 116A, 116B and 116C have a subscriber agreement that allows for this particular service of seamlessly joining a communication session.

In one embodiment, responsive to a determination that the third communication device 116C (or a user thereof) is authorized to join in the communication session 125, a session adjustment request can be transmitted from the first communication device 116A to the network server 130 during the communication session, where the session adjustment request is transmitted without interrupting the communication session (e.g., without requiring the session to be paused or otherwise preventing voice and/or video signals captured at the first and/or second communication devices from being exchanged via the communication session). In this example, the transmitting of the session adjustment request causes the network server 130 to adjust the communication session to add the third communication device 116C to the communication session as illustrated by reference numeral 175. The adjustment of the communication session 125 can be performed seamlessly without interruption of exchanging of the captured voice and/or video during the communication session.

In another embodiment, the network server 130 can determine that the third communication device 116C (or a user thereof) is authorized to join in the communication session 125. In response to this determination by the network server 130, a session adjustment can be performed by the network server 130 to add the third communication device 116C to the communication session as illustrated by reference numeral 175 without interrupting the communication session (e.g., without requiring the session to be paused or otherwise preventing captured voice and/or video signals from being exchanged via the communication session).

In one embodiment, one or both of the first or second communication devices 116A or 116B can retain control over the access to the communication session by the third communication device 116C, including selectively preventing the third communication device from receiving and/or transmitting voice and/or video signals via the communication session. For example, the first communication device 116A, responsive to user input, can transmit control signals to the network server 130 which then prevents (or otherwise causes) the third communication device from receiving voice and/or video signals originating from the first and/or second communication devices 116A and 116B. As another example, the first communication device 116A, responsive to the user input at the first communication device, can transmit control signals to the network server 130 which then prevents (or otherwise causes) the first and/or second communication devices 116A and 116B from receiving voice and/or video signals originating from the third communication device 116C. In one embodiment, the first and/or second communication device 116A and 116B can present a button which, when pressed, prevents the third communication device 116C from receiving and/or transmitting voice and/or video signals via the communication session.

In one embodiment, the conferencing information can be updated or otherwise provisioned between devices according to peer-to-peer communications. For example, prior to the communication session 125, the first communication device 116A can receive conference update data and can adjust the conferencing information according to the conference update data to indicate that the user of the third communication device 116C is authorized to join in communication sessions with the first communication device. In one embodiment, peer-to-peer provisioning of the conferencing information can be utilized, such as based on near-field communications between the first and third communication devices 116A and 116C, including being triggered according to physical contact or near-physical contact of the communication devices.

Any number of communication devices 116 can be originally participating in the communication session 125 and any number of communication devices can be seamlessly added to the communication session. Additionally, the adjustment of the communication session can be performed any number of times to add and/or remove any number of devices without interrupting the communication session. In one or more embodiments, the network server 130 can include software for performing functions 162 which can include receiving a session adjustment request during a communication session providing voice communications between first and second communication devices where the session adjustment request identifying a third communication device; accessing conferencing information indicating communication devices that are authorized to join in the communication session; responsive to a determination that the third communication device is authorized to join in the communication session according to the conferencing information, adjusting the communication session to enable the third communication device to participate in the communication session without interrupting the communication session; and/or controlling access by the third communication device to the communication session according to a control signal received from the first communication device during the communication session.

In one or more embodiments, the first (and/or second) communication device 116A can include software for performing functions 164 which can include participating in a communication session with a second communication device where the communication session provides voice communications; detecting, during the communication session, a third communication device in proximity to the first communication device; transmitting a session adjustment request to a network server during the communication session, where the session adjustment request is transmitted without interrupting the communication session, and where the transmitting of the session adjustment request causes the network server to adjust the communication session to add the third communication device responsive to a determination according to conferencing information that the third communication device is authorized to join in the communication session; receiving user input at the user interface; and/or controlling access by the third communication device to the communication session according to the user input.

FIG. 2 depicts an illustrative embodiment of signaling flow 200 that can be used for adjusting the communication session 125 of FIG. 1. Signaling flow 200 is described based on an example of a family (father, mother and daughter) utilizing mobile phones 116A-C in a voice conference call. However, signaling flow 200 can be applied to other users (including other numbers of users), other devices, and other types of communication sessions. In this example, a physical contact between the third communication device 116C and the first communication device 116A via near-field communications can trigger an authorization determination. Further to this example, a separate authorization system 230 and communication session adjustment system 235 can be utilized. However, the authorization and session adjustment can be performed by a single network server performing both functions.

As an example, the authorization system 230 can access a list of authorized devices or users that are associated with one or both of the first and second communication devices 116A and 116B (or any number of users and/or devices that are already participating in the established communication session). Once the third communication device (or its user) is validated then a request can be sent from the authorization system 230 to the communication session adjustment system 235 to add the third communication device 116C to the communications session 125, such as via various network control signals being exchanged between network elements. In one embodiment, the adding of the third communication device 116C to the communication session 125 can include the communication session adjustment system 235 sending a notification (e.g., causing a ringing) to the third communication device which, when answered, adds the third communication device to the communication session.

Figure 3:
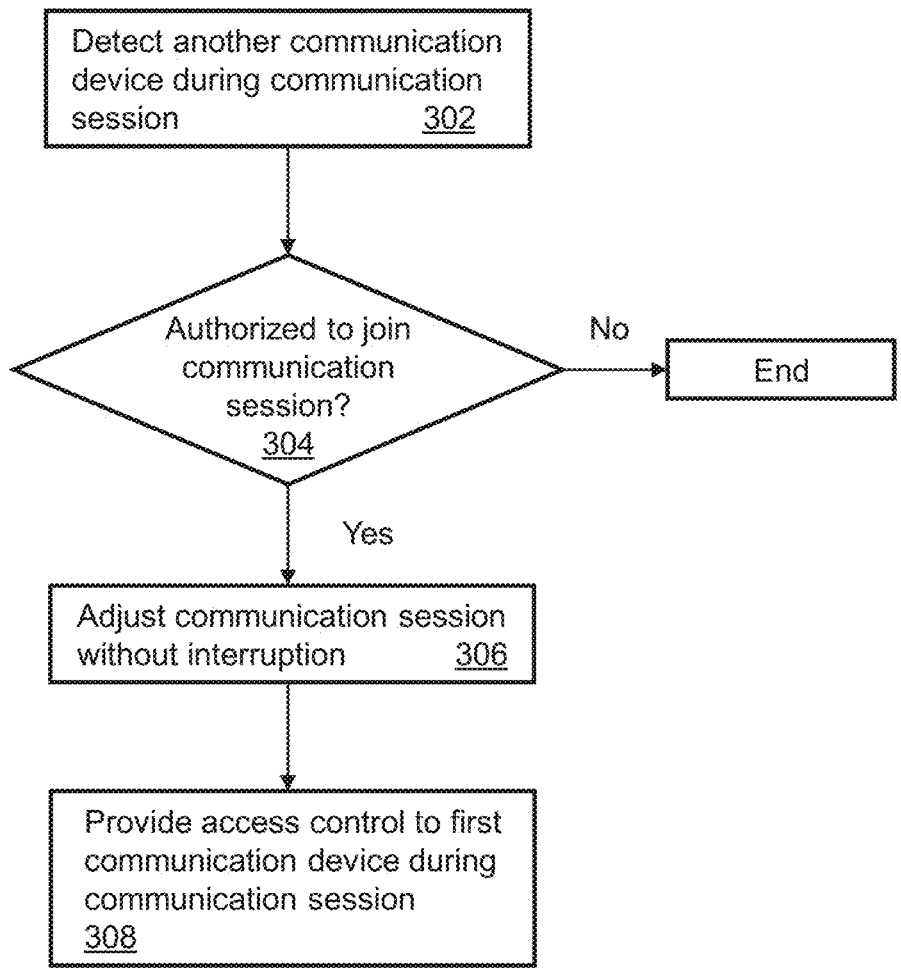
FIG. 3 depicts an illustrative embodiment of a method used in portions of the system and signaling flow described in FIGS. 1 and 2.

FIG. 3 depicts an illustrative embodiment of a method 300 used by one or more devices of FIGS. 1 and 2 to enable seamless addition and/or removal of devices from a communication session without interrupting the communication session. During a communication session (e.g., a voice and/or video conference), at 302 another communication device can be detected where a user of the other communication device desires to join into the communication session. The detecting can be based on various techniques and criteria, including a proximity detection performed by a first communication device that is already participating on the communication session. The detection at 302 can be performed without interrupting the communication session.

At 304, a determination can be made as to whether the other communication device is authorized to be joined to the communication session. The determination can be performed by one or more devices already participating in the communication session and/or by a network server. The determination can be performed in various ways, such as based on a list of authorized devices associated with one or more devices already participating in the communication session and/or based on a request and acceptance to join that is exchanged with one or more devices already participating in the communication session. The determination at 304 can be performed without interrupting the communication session.

If the other communication device is not authorized to join the communication session then method 300 can end. If on the other hand a determination is made that the other communication device is authorized to join the communication session then at 306 a network server can adjust the communication session to add the other communication device. The adjustment of the communication session can be performed without interrupting the communication session.

At 308, one or more devices that were already participating in the communication session can be provided with control over the level of access to the communication session that the other communication session receives. For example, a first communication device can transmit control signals to the network server causing the third communication device to not receive voice signals originating from the first communication device and/or from one or more other devices that were already participating on the communication session. In another example, the first communication device can transmit control signals to the network server to prevent the other communication device from transmitting voice and/or video signals via the communication session.

Figure 4:
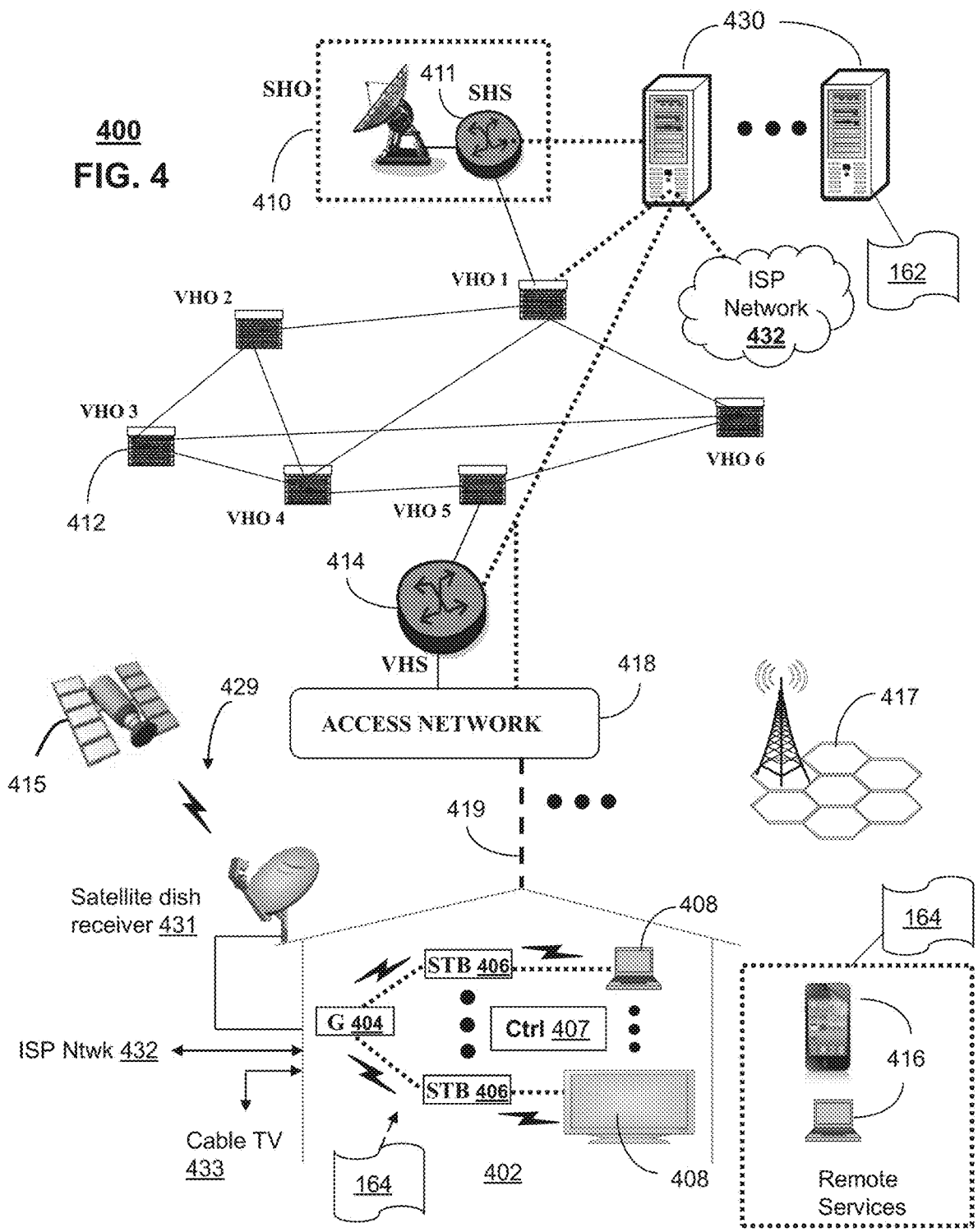
FIGS. 4-5 depict illustrative embodiments of communication systems that provide media services including seamless adding and/or removing of devices from a communication session.

FIG. 4 depicts an illustrative embodiment of a first communication system 400 for delivering media content. The communication system 400 can represent an Interactive Television system, such as including an Internet Protocol Television (IPTV) media system. Communication system 400 can be overlaid or operably coupled with system 100 of FIG. 1 as another representative embodiment of communication system 400. For instance, one or more devices illustrated in the communication system 400 of FIG. 4 can perform functions 162 which can include receiving a session adjustment request during a communication session providing voice communications between first and second communication devices where the session adjustment request identifying a third communication device; accessing conferencing information indicating communication devices that are authorized to join in the communication session; responsive to a determination that the third communication device is authorized to join in the communication session according to the conferencing information, adjusting the communication session to enable the third communication device to participate in the communication session without interrupting the communication session; and/or controlling access by the third communication device to the communication session according to a control signal received from the first communication device during the communication session.

Additionally, one or more devices illustrated in the communication system 400 of FIG. 4 can perform functions 164 which can include participating in a communication session with a second communication device where the communication session provides voice communications; detecting, during the communication session, a third communication device in proximity to the first communication device; transmitting a session adjustment request to a network server during the communication session, where the session adjustment request is transmitted without interrupting the communication session, and where the transmitting of the session adjustment request causes the network server to adjust the communication session to add the third communication device responsive to a determination according to conferencing information that the third communication device is authorized to join in the communication session; receiving user input at the user interface; and/or controlling access by the third communication device to the communication session according to the user input.

The IPTV media system can include a super head-end office (SHO) 410 with at least one super headend office server (SHS) 411 which receives media content from satellite and/or terrestrial communication systems. In the present context, media content can represent, for example, audio content, moving image content such as 2D or 3D videos, video games, virtual reality content, still image content, and combinations thereof. The SHS server 411 can forward packets associated with the media content to one or more video head-end servers (VHS) 414 via a network of video head-end offices (VHO) 412 according to a multicast communication protocol.

The VHS 414 can distribute multimedia broadcast content via an access network 418 to commercial and/or residential buildings 402 housing a gateway 404 (such as a residential or commercial gateway). The access network 418 can represent a group of digital subscriber line access multiplexers (DSLAMs) located in a central office or a service area interface that provide broadband services over fiber optical links or copper twisted pairs 419 to buildings 402. The gateway 404 can use communication technology to distribute broadcast signals to media processors 406 such as Set-Top Boxes (STBs) which in turn present broadcast channels to media devices 408 such as computers or television sets managed in some instances by a media controller 407 (such as an infrared or RF remote controller).

The gateway 404, the media processors 406, and media devices 408 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 406 and subsystems of the IPTV media system for services such as video-on-demand (VoD), browsing an electronic programming guide (EPG), or other infrastructure services.

A satellite broadcast television system 429 can be used in the media system of FIG. 4. The satellite broadcast television system can be overlaid, operably coupled with, or replace the IPTV system as another representative embodiment of communication system 400. In this embodiment, signals transmitted by a satellite 415 that include media content can be received by a satellite dish receiver 431 coupled to the building 402. Modulated signals received by the satellite dish receiver 431 can be transferred to the media processors 406 for demodulating, decoding, encoding, and/or distributing broadcast channels to the media devices 408. The media processors 406 can be equipped with a broadband port to an Internet Service Provider (ISP) network 432 to enable interactive services such as VoD and EPG as described above.

In yet another embodiment, an analog or digital cable broadcast distribution system such as cable TV system 433 can be overlaid, operably coupled with, or replace the IPTV system and/or the satellite TV system as another representative embodiment of communication system 400. In this embodiment, the cable TV system 433 can also provide Internet, telephony, and interactive media services. System 400 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 430, a portion of which can operate as a web server for providing web portal services over the ISP network 432 to wireline media devices 408 or wireless communication devices 416.

Communication system 400 can also provide for all or a portion of the computing devices 430 to function as an authorization and/or session adjustment server (herein referred to as server 430). The server 430 can use computing and communication technology to perform function 162, similar to server 130 of FIG. 1, as described above. The media processors 406 and wireless communication devices 416 can be provisioned with software functions 164 to utilize the services of server 430.

Multiple forms of media services can be offered to media devices over landline technologies such as those described above. Additionally, media services can be offered to media devices by way of a wireless access base station 417 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 5:
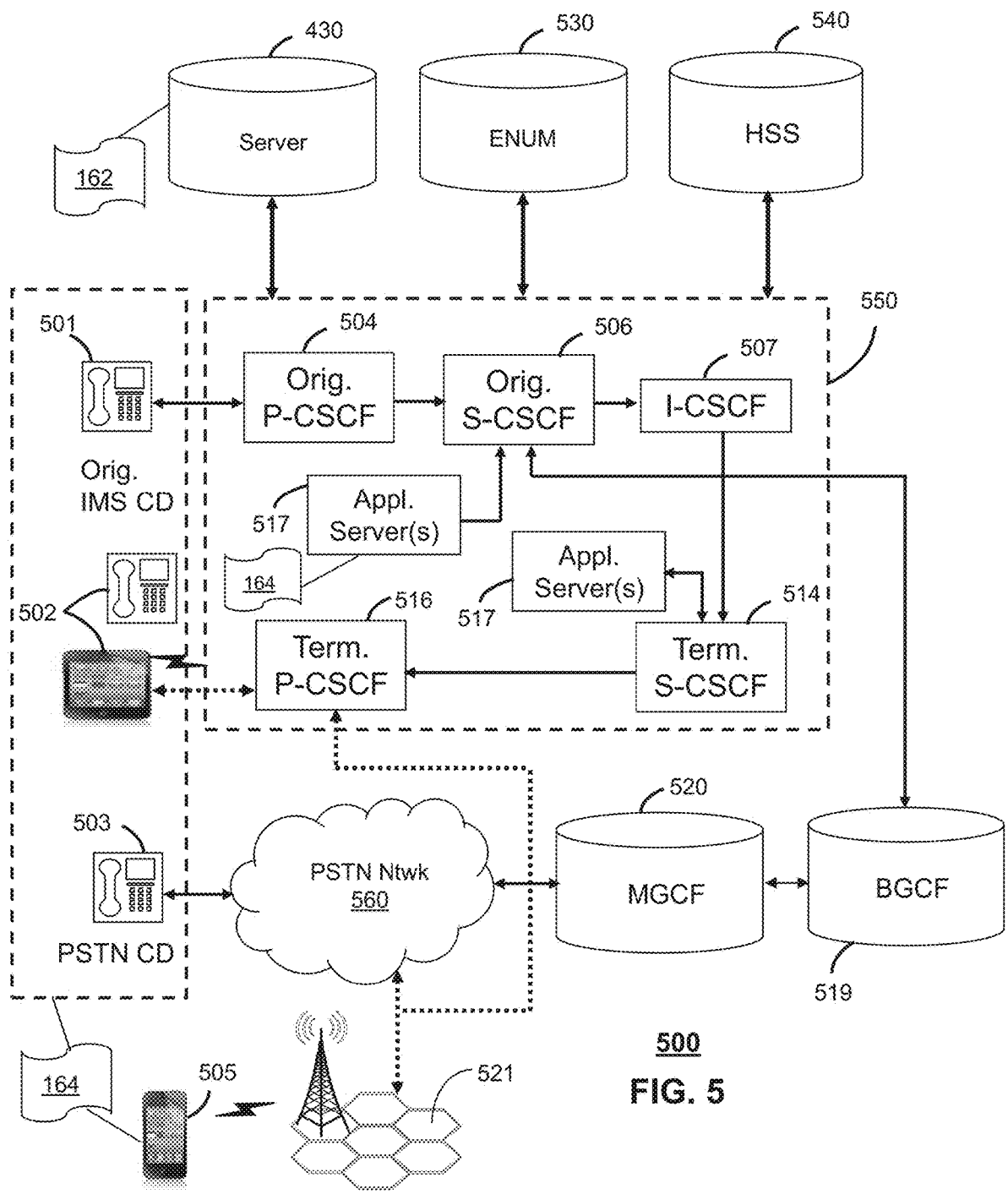

FIG. 5 depicts an illustrative embodiment of a communication system 500 employing an IP Multimedia Subsystem (IMS) network architecture to facilitate the combined services of circuit-switched and packet-switched systems. Communication system 500 can be overlaid or operably coupled with system 100 of FIG. 1 and communication system 400 as another representative embodiment of communication system 400. System 500 enables seamless adjustments to communication sessions between devices. Parties can be added to a communication session without interrupting the communication session. The addition of a party can be based on pre-authorization data, such as family, friends, business associates and so forth that one or more parties already participating in the communication session desire to allow to be added to the communication session.

Communication system 500 can comprise a Home Subscriber Server (HSS) 540, a tElephone NUmber Mapping (ENUM) server 530, and other network elements of an IMS network 550. The IMS network 550 can establish communications between IMS-compliant communication devices (CDs) 501, 502, Public Switched Telephone Network (PSTN) CDs 503, 505, and combinations thereof by way of a Media Gateway Control Function (MGCF) 520 coupled to a PSTN network 560. The MGCF 520 need not be used when a communication session involves IMS CD to IMS CD communications. A communication session involving at least one PSTN CD may utilize the MGCF 520.

IMS CDs 501, 502 can register with the IMS network 550 by contacting a Proxy Call Session Control Function (P-CSCF) which communicates with an interrogating CSCF (I-CSCF), which in turn, communicates with a Serving CSCF (S-CSCF) to register the CDs with the HSS 540. To initiate a communication session between CDs, an originating IMS CD 501 can submit a Session Initiation Protocol (SIP INVITE) message to an originating P-CSCF 504 which communicates with a corresponding originating S-CSCF 506. The originating S-CSCF 506 can submit the SIP INVITE message to one or more application servers (ASs) 517 that can provide a variety of services to IMS subscribers.

For example, the application servers 517 can be used to perform originating call feature treatment functions on the calling party number received by the originating S-CSCF 506 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 506 can submit queries to the ENUM system 530 to translate an E.164 telephone number in the SIP INVITE message to a SIP Uniform Resource Identifier (URI) if the terminating communication device is IMS-compliant. The SIP URI can be used by an Interrogating CSCF (I-CSCF) 507 to submit a query to the HSS 540 to identify a terminating S-CSCF 514 associated with a terminating IMS CD such as reference 502. Once identified, the I-CSCF 507 can submit the SIP INVITE message to the terminating S-CSCF 514. The terminating S-CSCF 514 can then identify a terminating P-CSCF 516 associated with the terminating CD 502. The P-CSCF 516 may then signal the CD 502 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 5 may be interchangeable. It is further noted that communication system 500 can be adapted to support video conferencing. In addition, communication system 500 can be adapted to provide the IMS CDs 501, 502 with the multimedia and Internet services of communication system 400 of FIG. 4.

If the terminating communication device is instead a PSTN CD such as CD 503 or CD 505 (in instances where the cellular phone only supports circuit-switched voice communications), the ENUM system 530 can respond with an unsuccessful address resolution which can cause the originating S-CSCF 506 to forward the call to the MGCF 520 via a Breakout Gateway Control Function (BGCF) 519. The MGCF 520 can then initiate the call to the terminating PSTN CD over the PSTN network 560 to enable the calling and called parties to engage in voice and/or data communications.

It is further appreciated that the CDs of FIG. 5 can operate as wireline or wireless devices. For example, the CDs of FIG. 5 can be communicatively coupled to a cellular base station 521, a femtocell, a WiFi router, a Digital Enhanced Cordless Telecommunications (DECT) base unit, or another suitable wireless access unit to establish communications with the IMS network 550 of FIG. 5. The cellular access base station 521 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 5.

Cellular phones supporting LTE can support packet-switched voice and packet-switched data communications and thus may operate as IMS-compliant mobile devices. In this embodiment, the cellular base station 521 may communicate directly with the IMS network 550 as shown by the arrow connecting the cellular base station 521 and the P-CSCF 516.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The server 430 of FIG. 4 can be operably coupled to communication system 500 for purposes similar to those described above. Server 430 can perform function 162 and thereby provide authorization and communication session adjustment services to the CDs 501, 502, 503 and 505 of FIG. 5 similar to the functions described for server 130 of FIG. 1 in accordance with method 300 of FIG. 3. CDs 501, 502, 503 and 505, which can be adapted with software to perform function 164 to utilize the services of the server 430. The authorization and/or session adjustment functions 162 can also be performed by other network elements, such as by application server(s) 517, where the functions 162 are adapted to the operations of the IMS network 550.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 6:
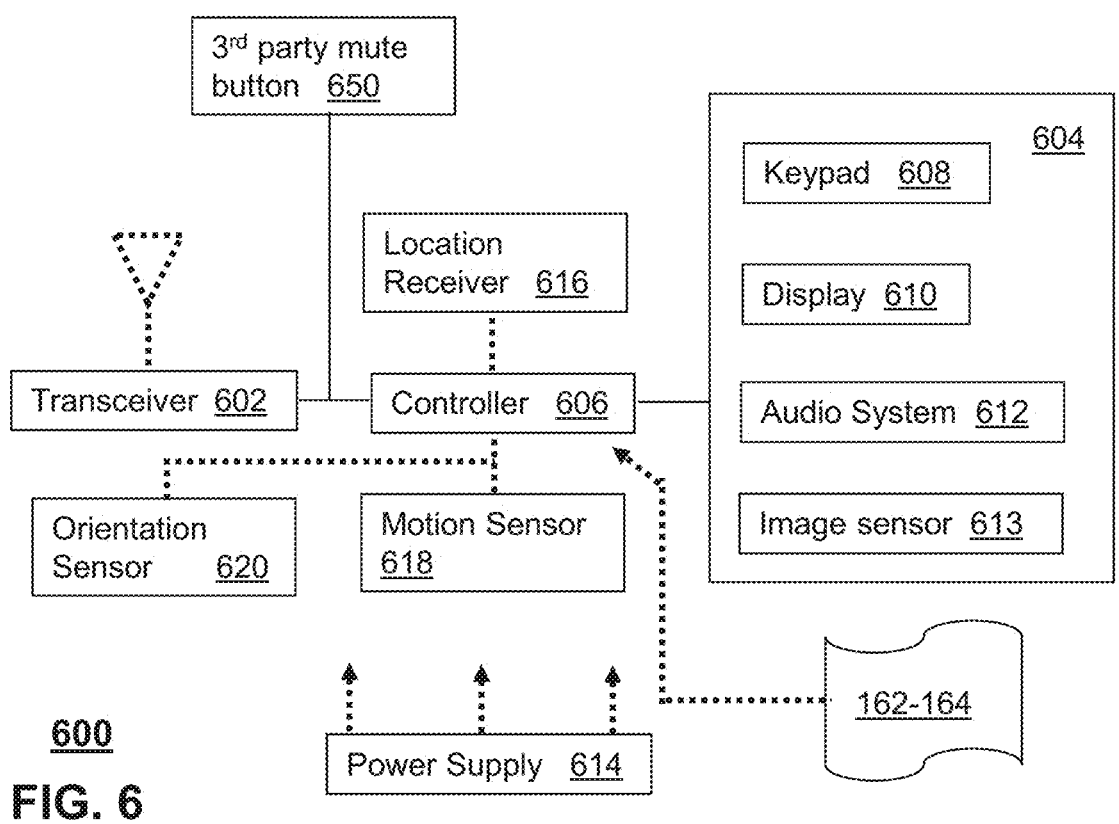
FIG. 6 depicts an illustrative embodiment of a communication device that can engage in seamless adding and/or removing of devices from a communication session.

FIG. 6 depicts an illustrative embodiment of a communication device 600. Communication device 600 can serve in whole or in part as an illustrative embodiment of the devices depicted in FIGS. 1 and/or 2, and FIGS. 4-5 and can be configured to perform portions of method 300 of FIG. 3.

As an example, communication device 600 can perform one or more of detecting, during a communication session, another communication device (e.g., based on proximity detection); determine, according to conferencing information, that the other communication device is authorized to join in the communication session; transmit a session adjustment request to a network server during the communication session to add the other communication device to the communication session; and/or control access by the other communication device to the communication session according to user input.

Communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface with graphical user interface (GUI) elements that can be selected by a user with a touch of a finger. The touch screen display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable applications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a reset button (not shown). The reset button can be used to reset the controller 606 of the communication device 600. In yet another embodiment, the communication device 600 can also include a factory default setting button positioned, for example, below a small hole in a housing assembly of the communication device 600 to force the communication device 600 to re-establish factory settings. In this embodiment, a user can use a protruding object such as a pen or paper clip tip to reach into the hole and depress the default setting button. The communication device 600 can also include a slot for adding or removing an identity module such as a Subscriber Identity Module (SIM) card. SIM cards can be used for identifying subscriber services, executing programs, storing subscriber data, and so forth.

The communication device 600 as described herein can operate with more or less of the circuit components shown in FIG. 6. These variant embodiments can be used in one or more embodiments of the subject disclosure.

The communication device 600 can be adapted to perform the functions of the devices of FIGS. 1 and/or 2, the media processor 406, the media devices 408, or the portable communication devices 416 of FIG. 4, as well as the IMS CDs 501-502 and PSTN CDs 503-505 of FIG. 5. It will be appreciated that the communication device 600 can also represent other devices that can operate in systems of FIGS. 1 and/or 2, and communication systems 400-500 of FIGS.

4-5, such as a gaming console and a media player. In addition, the controller 606 can be adapted in various embodiments to perform the functions 162 and 164.

In one embodiment, communication device 600 can include an icon or button 650 (e.g., presented on a touch-sensitive screen) that enables control over the access to the communication session by another communication device that has been added to the communication session. As an example, a user of communication device 600 can press and/or hold button 650 to prevent a newly added communication device from receiving voice signals originating from other device(s) that were already part of the communication session. In another example, actuation of button 650 can prevent the newly added communication device from transmitting signals (e.g., voice and/or video) other device (s) that were already part of the communication session Upon reviewing the aforementioned embodiments, it would be evident to an artisan with ordinary skill in the art that said embodiments can be modified, reduced, or enhanced without departing from the scope of the claims described below. For example, other control options can be presented to one or more devices that were already part of the communication session, such as controlling whether the newly added communication device receives only audio during a video conference. In one or more embodiments, the control can be designated to the device that requests the network server to add the other communication device. In another embodiment, multiple devices can be added (and/or removed) from the communication session at different times. The access control over these newly added devices can be centralized in one device (that was already participating in the communication session) or can be distributed over all or some of the devices (that were already participating in the communication session). In one embodiment, different devices (that were already participating in the communication session) can control access to the communication session by different newly added devices, such as based on being the device that added the new communication device to the communication session.

In one embodiment, the conferencing information associated with a first communication device can designate groups of users (or devices) that are permitted to be joined with each other into an on-going communication session. For example, a TAP list (e.g., conferencing information designating authorized users or devices) for a user can identify business associates and family members. The user's communication device can limit joining the on-going communication session for a business associate to when all of the members of the on-going communication session are identified as other business associates. As another example, the user's communication device can limit joining the on-going communication session for a family member to when all of the members of the communication session are identified as other family members. Various rules can be generated and applied to determining, from the TAP list, who can or cannot be joined to an on-going communication session.

In one or more embodiments, the detection and authentication can be initiated and/or performed by the other communication device seeking to join the communication session. For example, the other communication device can generate an authorization request and/or a session adjustment request which is sent to one or more of the devices already participating in the communication session and/or is sent to a network server. The authorization determination can be made according to conferencing information (e.g., stored in the network and/or stored locally at one of the devices) associated with one or more devices already participating in the communication session. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 7:
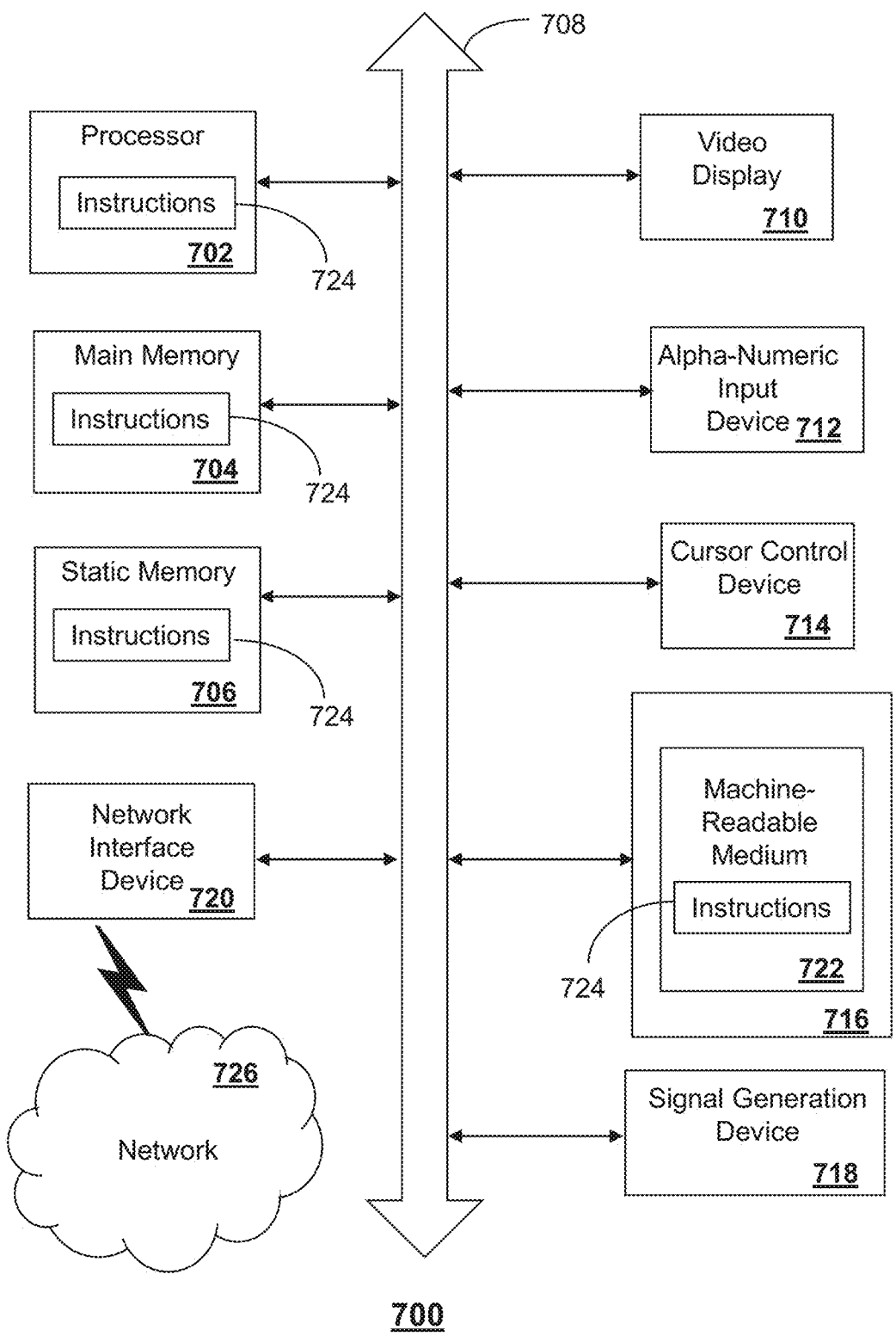
FIG. 7 is a diagrammatic representation of a machine in the form of a computer system within which a set of instructions, when executed, may cause the machine to perform any one or more of the methods described herein.

FIG. 7 depicts an exemplary diagrammatic representation of a machine in the form of a computer system 700 within which a set of instructions, when executed, may cause the machine to perform any one or more of the methods described above. One or more instances of the machine can operate, for example, as the server 130 and/or 430, the media processor 406 and other devices of FIGS. 1-2 and 4-6 to enable seamless adding and/or removing of communication devices to an already established communication session. In some embodiments, the machine may be connected (e.g., using a network 726) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 700 may include a processor (or controller) 702 (e.g., a central processing unit (CPU)), a graphics processing unit (GPU, or both), a main memory 704 and a static memory 706, which communicate with each other via a bus 708. The computer system 700 may further include a display unit 710 (e.g., a liquid crystal display (LCD), a flat panel, or a solid state display). The computer system 700 may include an input device 712 (e.g., a keyboard), a cursor control device 714 (e.g., a mouse), a disk drive unit 716, a signal generation device 718 (e.g., a speaker or remote control) and a network interface device 720. In distributed environments, the embodiments described in the subject disclosure can be adapted to utilize multiple display units 710 controlled by two or more computer systems 700. In this configuration, presentations described by the subject disclosure may in part be shown in a first of the display units 710, while the remaining portion is presented in a second of the display units 710.

The disk drive unit 716 may include a tangible computer-readable storage medium 722 on which is stored one or more sets of instructions (e.g., software 724) embodying any one or more of the methods or functions described herein, including those methods illustrated above. The instructions 724 may also reside, completely or at least partially, within the main memory 704, the static memory 706, and/or within the processor 702 during execution thereof by the computer system 700. The main memory 704 and the processor 702 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 722 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 700.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A first communication device, comprising:
   a user interface;
   a processor coupled with the user interface; and
   a memory that stores executable instructions that, when executed by the processor, facilitate performance of operations, comprising:
     participating in a communication session with a second communication device, the communication session providing voice communications;
     detecting, during the communication session, a third communication device in proximity to the first communication device by a near-field proximity function;
     accessing, during the communication session, a pre-validated list indicating that the third communication device is authorized to join in the communication session, wherein the pre-validated list comprises a list of authorized devices that may join a conference between the first communication device and the second communication device;
     transmitting an authorization request to the second communication device responsive to the detecting of the third communication device in proximity to the first communication device;
     receiving an acceptance to the authorization request from the second communication device; and
     responsive to a determination that the third communication device is authorized to join in the communication session according to the pre-validated list and according to the acceptance, transmitting a session adjustment request to a network server during the communication session, wherein the session adjustment request is transmitted without interrupting the communication session, wherein the transmitting of the session adjustment request causes the network server to adjust the communication session to add the third communication device to the communication session while controlling access by the third communication device to the communication session according to a user input, resulting in an adjusted communication session comprising the first communication device, the second communication device and the third communication device.

2. The first communication device of claim 1, wherein the controlling of the access by the third communication device includes transmitting control signals to the network server causing the third communication device to not receive voice signals originating from the second communication device.

3. The first communication device of claim 2, wherein the controlling of the access by the third communication device includes transmitting control signals to the network server causing the first communication device to not receive voice signals originating from the third communication device.

4. The first communication device of claim 1, wherein the operations further comprise storing the pre-validated list in the memory.

5. The first communication device of claim 4, wherein the operations further comprise:
   receiving conference update data prior to the communication session; and
   adjusting the pre-validated list according to the conference update data to indicate that a user of the third communication device is authorized to join in communication sessions with the first communication device.

6. The first communication device of claim 5, wherein the conference update data is received from the third communication device.

7. The first communication device of claim 1, wherein the transmitting of the authorization request and the receiving of the acceptance are performed without interrupting the communication session.

8. The first communication device of claim 1, wherein the network server adjusts the communication session to add the third communication device based in part on an authorization generated at the second communication device.

9. The first communication device of claim 1, wherein the pre-validated list is stored on the first communication device.

10. The first communication device of claim 1, wherein the near-field proximity function includes physical contact between the first communication device and the third communication device, and wherein the controlling of the access by the third communication device includes presenting a button which, when pressed, prevents the third communication device from transmitting voice and video signals.

11. A method comprising:
    receiving, by a network server, a session adjustment request during a communication session providing voice communications between first and second communication devices, the session adjustment request identifying a third communication device to add to the communication session;
    accessing, by the network server, a pre-validated list indicating communication devices that are authorized to join in the communication session, wherein the pre-validated list comprises a list of authorized devices that can join the communication session between the first communication device and the second communication device;

receiving, by the network server, an acceptance message from the second communication device responsive to an authorization request transmitted from the first communication device to the second communication device, wherein the authorization request is in accordance with the first communication device detecting the third communication device in proximity to the first communication device, responsive to a determination that the third communication device is authorized to join in the communication session according to the pre-validated list and the acceptance message, adjusting, by the network server, the communication session to add the third communication device for participation in the communication session without interrupting the communication session between the first and second communication devices, resulting in an adjusted communication session comprising the first communication device, the second communication device and the third communication device; and controlling, by the network server, access by the third communication device to the adjusted communication session according to a control signal received from the first communication device during the adjusted communication session.

12. The method of claim 11, wherein the controlling of the access by the third communication device includes causing the third communication device to not receive voice signals originating from the second communication device.

13. The method of claim 11, wherein the controlling of the access by the third communication device includes causing the first communication device to not receive voice signals originating from the third communication device.

14. The method of claim 11, wherein the receiving of the session adjustment request during the communication session is responsive to a detection, by the first communication device, of a third communication device in proximity to the first communication device via a Bluetooth function.

15. The method of claim 11, further comprising:
receiving, by the network server, conference update data prior to the communication session; and
adjusting, by the network server, conferencing information according to the conference update data to indicate that the third communication device is authorized to join in communication sessions with the first communication device.

16. The method of claim 15, wherein the conference update data is received from the first communication device.

17. The method of claim 11, wherein the session adjustment request is received from the first communication device.

18. A machine-readable storage device, comprising executable instructions that, when executed by a processor of a first communication device, facilitate performance of operations, comprising:
participating in a communication session with a second communication device;
detecting, during the communication session, a third communication device in proximity to the first communication device by a near-field proximity function;
transmitting an authorization request to the second communication device responsive to the detecting of the third communication device in proximity to the first communication device;
receiving an acceptance to the authorization request from the second communication device; and
transmitting a session adjustment request to add the third communication device to the communication session to a network server during the communication session, wherein the session adjustment request is transmitted without interrupting the communication session, and wherein the transmitting of the session adjustment request causes the network server to adjust the communication session to add the third communication device responsive to a determination according to a pre-validated list that the third communication device is authorized to join in any communication session between the first communication device and the second communication device and the acceptance, wherein the first communication device controls access by the third communication device to the communication session according to a user input, resulting in an adjusted communication session comprising the first communication device, the second communication device and the third communication device.

19. The machine-readable storage device of claim 18, wherein the controlling of the access by the third communication device includes transmitting control signals to the network server causing the third communication device to not receive voice signals originating from the second communication device.

20. The machine-readable storage device of claim 18, wherein the controlling of the access by the third communication device includes causing the first communication device to not receive voice signals originating from the third communication device.

* * * * *